No. 853,915. PATENTED MAY 14, 1907.
J. D. BOWLES & G. H. KAMMERICH.
APPARATUS FOR EXTRACTING GAS FROM GASOLENE.
APPLICATION FILED JUNE 19, 1906.
2 SHEETS—SHEET 2.
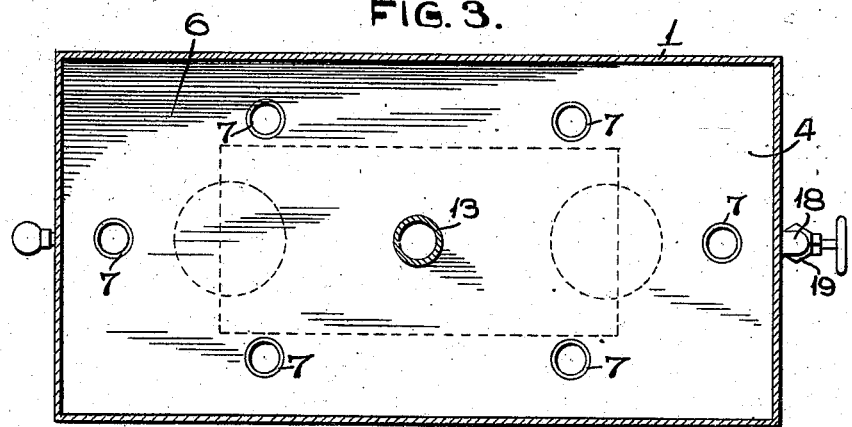
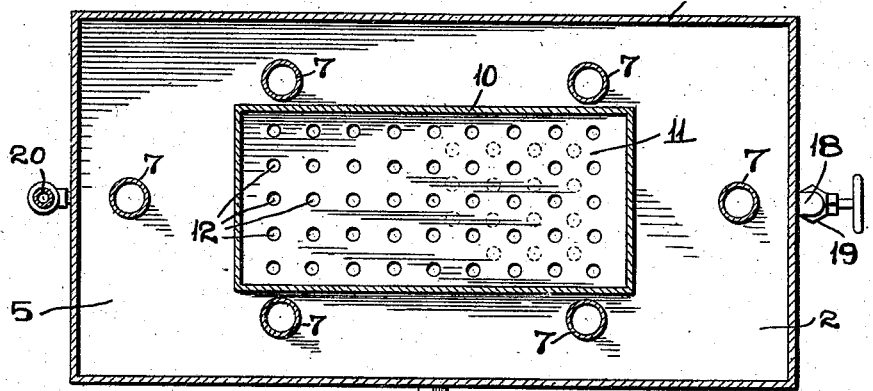
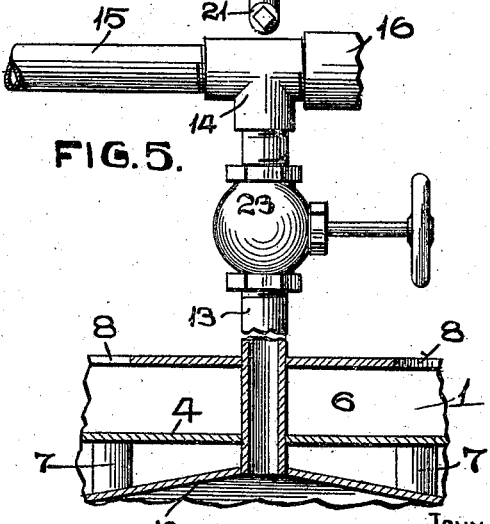
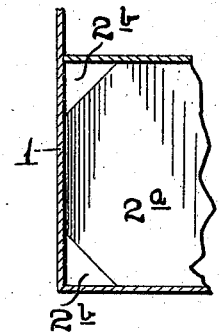
ATTEST.
H. J. Fletcher.
W. P. Smith.
INVENTORS.
JOHN D. BOWLES.
GEORGE H. KAMMERICH.
BY Higdon & Longan
ATTY'S

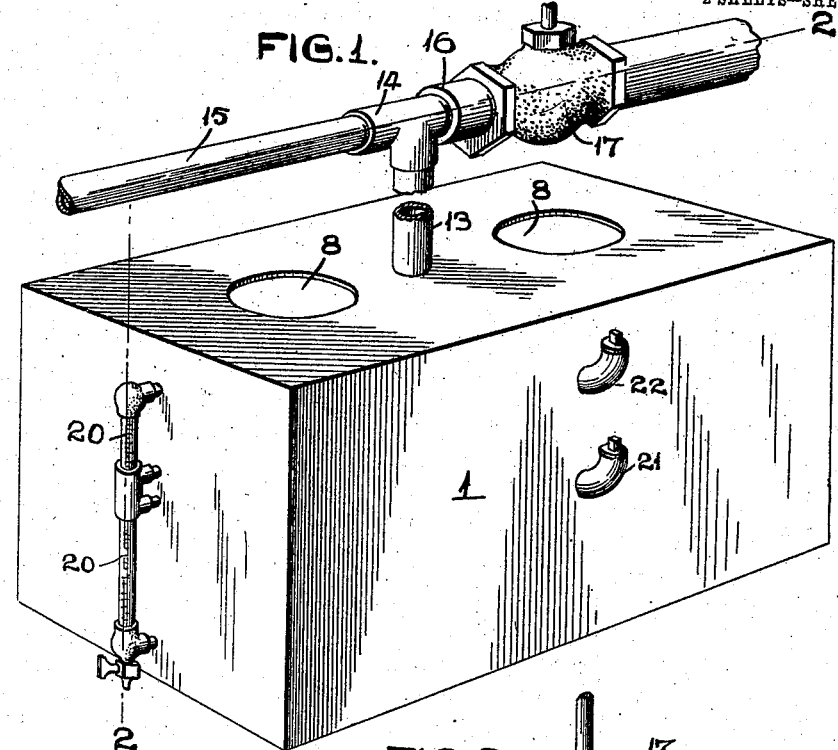
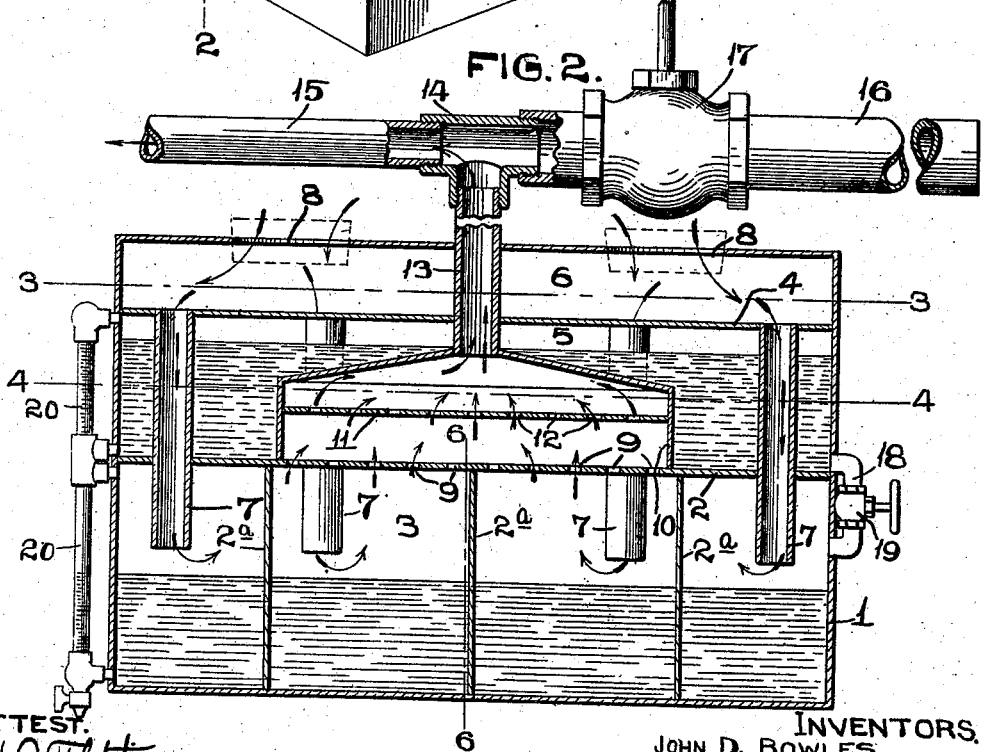

UNITED STATES PATENT OFFICE.

JOHN D. BOWLES AND GEORGE H. KAMMERICH, OF TIPTON, MISSOURI, ASSIGNORS OF ONE-THIRD TO ROY F. BANE, OF TIPTON, MISSOURI.

APPARATUS FOR EXTRACTING GAS FROM GASOLENE.

No. 853,915. Specification of Letters Patent. Patented May 14, 1907.

Application filed June 19, 1906. Serial No. 322,472.

*To all whom it may concern:*

Be it known that we, JOHN D. BOWLES and GEORGE H. KAMMERICH, citizens of the United States, and residents of Tipton, Moniteau county, Missouri, have invented certain new and useful Improvements in Apparatus for Extracting Gas from Gasolene, of which the following is a specification, containing a full, clear, and exact description, reference being had to the accompanying drawings, forming a part hereof.

Our invention relates to an apparatus for extracting gas from gasolene, and the object of our invention is to construct a simple apparatus wherein atmospheric air is passed through a suitable liquid hydrocarbon in order that said air may be thoroughly carbureted, which apparatus is especially designed for feeding an internal combustion engine or motor, such as is ordinarily used on motor vehicles.

A further object of our invention is to provide means whereby a proportionate amount of atmospheric air is delivered to and mixed with the carbureted air after said carbureted air has left the apparatus, and prior to its passage into the engine or motor.

Our invention consists in a tank, or receptacle, containing liquid hydrocarbon, a tubular connection leading from said tank to the engine, or motor, an air pipe leading to said tubular connection, and a valve located in said air pipe.

Our invention further consists in certain novel features of construction and arrangement of parts, which will be hereinafter more fully set forth, pointed out in the claims, and illustrated in the accompanying drawings, in which:—

Figure 1 is a perspective view of our improved apparatus; Fig. 2 is a vertical section taken on the line 2—2 of Fig. 1; Fig. 3 is a horizontal section taken on the line 3—3 of Fig. 2; Fig. 4 is a horizontal section taken on the line 4—4 of Fig. 2; Fig. 5 is a detail section taken through the top of the apparatus, and showing a controlling valve located in the carbureted air outlet pipe; Fig. 6 is a detail section taken on the line 6—6 of Fig. 2.

Referring by numerals to the accompanying drawings, 1 designates a tank, or receptacle, preferably rectangular in form, and constructed of suitable sheet metal. Horizontally disposed in the center of this tank is a partition 2, thus forming a compartment 3 below said partition, and the compartment above said partition is provided with a horizontally disposed partition 4, thus forming the compartments 5 and 6. The compartment 6 is at the top of the receptacle 1, and is preferably of lesser depth than is the compartment 5.

A plurality of transverse partitions $2^a$ are arranged in the compartment 3, the corners of which partitions are cut away, as designated by $2^b$, which partitions are for the purpose of preventing the liquid hydrocarbon which is located in the compartment 3 from splashing violently from one end of said compartment to the other.

Rigidly fixed in any suitable manner in the partitions 2 and 4 are the vertically disposed air inlet pipes 7, which are open at both ends, and which pipes extend downwardly a short distance below the partition 2 into the compartment 3. Formed in the top of the tank 1 is a plurality of openings 8, the combined areas of which are somewhat greater than the combined areas of the inlet passages through the pipes 7; and said openings are offset relative said pipes 7. Formed through the central portion of the partition 2 is a series of small openings, or perforations 9, and fixed on said partition, around said perforations, and extending upwardly into the compartment 5 is a housing 10. Horizontally disposed within this housing 10 is a partition 11, through which is formed a series of perforations 12, the same being offset, or staggered, relative the apertures 9 in the partition 2. The chamber formed by the housing 10 and provided with the partition 11 forms a mixing chamber for the carbureted air as it leaves the compartment 3, and before it is delivered to the carbureted air outlet pipe.

Leading upwardly from the top of the housing 10, through the partition 4 and top of the tank 1, is a carbureted air outlet pipe 13, to the upper end of which is secured a T-connection 14, and leading from one side of said T-connection is a pipe 15, which extends to the engine or motor, or other device in which the carbureted air is to be used. Connected to the end of the T-connection 14, opposite from the pipe 15, is an air inlet pipe 16, in which is located a suitable controlling valve 17. Leading from the compartment 5, downwardly into the compartment 3, at one end of the apparatus, is a tubular connection 18, in which is located a suitable valve 19. Located at the opposite end of the apparatus is a pair of vertically disposed gage glasses 20, the ends of which are suitably connected to the tops and bottoms of the compartments 3 and 5.

When the apparatus is in use, the compartment 3 is partially filled with liquid hydrocarbon through a suitably located inlet 21 located on the side of the tank, and the compartment 5 which may be properly termed a reservoir, may be entirely filled with a reserve supply of liquid hydrocarbon through a suitably located inlet 22. When all of the liquid hydrocarbon in the compartment 3 has been vaporized, or taken up by the air entering said compartment, the liquid hydrocarbon from the compartment 5 is discharged into the compartment 3 by opening the valve 19 in the tubular connection 18. The heights of the liquid in the compartments 3 and 5 are readily ascertained by the inspection of the gage glasses 20.

The engine or motor to which the pipe 15 leads while in operation creates a suction through said pipe 15, and as a result atmospheric air will enter the openings 8 in the top of the tank and pass from thence downwardly through the pipes 7 to the interior of the compartment 3. Said air, while in this compartment, will take up or become thoroughly impregnated with the vapor arising from the body of the hydrocarbon located in said compartment, and will pass from thence upwardly through the apertures in the partitions 2 and 11, and will pass from thence upwardly through the outlet pipe 13, to the T-connection 14, and at this point the carbureted air will meet and become mixed with atmospheric air which is drawn through the pipe 16, and partially opened valve 17. This mixture passes on through the pipe 15 to the engine or motor, to be used in the ordinary manner.

The valve 17 can be regulated so as to admit just the proper amount of atmospheric air necessary to mix with the carbureted air entering and passing through the pipe 15 to the engine; and, if desired, a suitable valve, such as 23, may be located in the pipe 13 for controlling the amount of carbureted air drawn through said pipe.

After a charge of carbureted air has been drawn into the engine, and the suction within the pipe 15 ceases, there will be a certain amount of back pressure through said pipe 15, and, for this reason, we prefer to extend the air inlet pipe 16 a considerable distance from the T-connection 14; and thus the carbureted air forced out of the pipe 15 by this back pressure will pass outwardly into said pipe 16 to be again drawn through the pipe 15 to the engine on the next suction stroke of said engine.

When the apparatus is not in use, the openings 8 may be closed by suitable plates, or corks, as shown in Fig. 2, which effectually prevents any vapor from escaping upwardly through the pipes 7, and through said openings 8. The openings 8 are staggered, or offset, relative the pipes 7, in order to prevent oil from splashing upwardly through said pipes 7, and out through the openings 8 when the apparatus is in use on a motor vehicle where it is subjected to considerable vibration.

An apparatus of our improved construction is applicable for any form of internal combustion engine, or motor, either stationary or portable, and the gas or carbureted air drawn from the apparatus by a suitable suction device, such as a pump, may be utilized for heating or lighting purposes, or applied to any purpose where gas or carbureted air may be advantageously used.

The apparatus may be made in any convenient size and shape, and where used in connection with a gas engine, or motor, does away with the ordinary form of carbureter, and the many disadvantages incident to the use thereof, and the exhaust from an engine or motor fed with our improved apparatus is devoid of all odor and smoke.

The entire apparatus is simple, inexpensive, easily applied for use, is very economical in the amount of liquid hydrocarbon used, and requires no attention other than a proper adjustment of the valve 17 to supply the proper amount of atmospheric air to the gas or carbureted air.

I claim:—

1. In an apparatus of the class described, a tank, in the lower portion of which is formed a compartment for containing liquid hydrocarbon, a series of partitions in the bottom of the liquid hydrocarbon compartment which divide the same into a series of communicating compartments, a mixing chamber within the tank immediately above the hydrocarbon compartment, a reservoir surrounding the mixing chamber, and a series of air inlet pipes leading downwardly through the reservoir into the hydrocarbon compartments.

2. In an apparatus of the class described, a tank for containing liquid hydrocarbon, a series of partitions in the bottom compartment of the tank which divide the same into a series of communicating compartments, a series of air inlet tubes leading into said compartments, a mixing chamber arranged above the hydrocarbon chamber and communicating therewith by means of apertures formed in the top of the hydrocarbon chamber, a carbureted air pipe leading from the mixing chamber, an air inlet pipe leading to the carbureted air outlet pipe outside the tank, and a controlling valve located in said last mentioned air inlet pipe.

3. In an apparatus of the class described, a tank for containing liquid hydrocarbon, a series of partitions in the bottom compartment of the tank which divide the same into a series of communicating compartments, a series of air inlet tubes leading into said compartments, a mixing chamber arranged above the hydrocarbon chamber and communicating therewith by means of apertures formed in the top of the hydrocarbon chamber, a hydrocarbon reservoir surrounding the mixing chamber, means whereby hydrocarbon is discharged from the reservoir into the communicating compartments, a carbureted air pipe leading from the mixing chamber, an air inlet pipe leading to the carbureted air outlet pipe outside the tank, and a controlling valve located in said last mentioned air inlet pipe.

4. In an apparatus of the class described, a tank for containing liquid hydrocarbon, a series of partitions in the bottom compartment of the tank which divide the same into a series of communicating compartments, a series of air inlet tubes leading into said compartments, a mixing chamber arranged above the hydrocarbon chamber and communicating therewith by means of apertures formed in the top of the hydrocarbon chamber, a hydrocarbon reservoir surrounding the mixing chamber, means whereby hydrocarbon is discharged from the reservoir into the communicating compartments, an air chamber arranged above the hydrocarbon reservoir, a carbureted air pipe leading from the mixing chamber, an air inlet pipe leading to the carbureted air outlet pipe outside the tank, and a controlling valve located in said last mentioned air inlet pipe.

In testimony whereof, we have signed our names to this specification, in presence of two subscribing witnesses.

JOHN D. BOWLES.
GEORGE H. KAMMERICH.

Witnesses:
E. E. LONGAN,
G. N. GILBERT.